Feb. 7, 1933.  J. M. NEWKIRK  1,896,553
HYDROMETER SYRINGE WITH LAMP ATTACHMENT
Filed Nov. 9, 1931  2 Sheets-Sheet 1
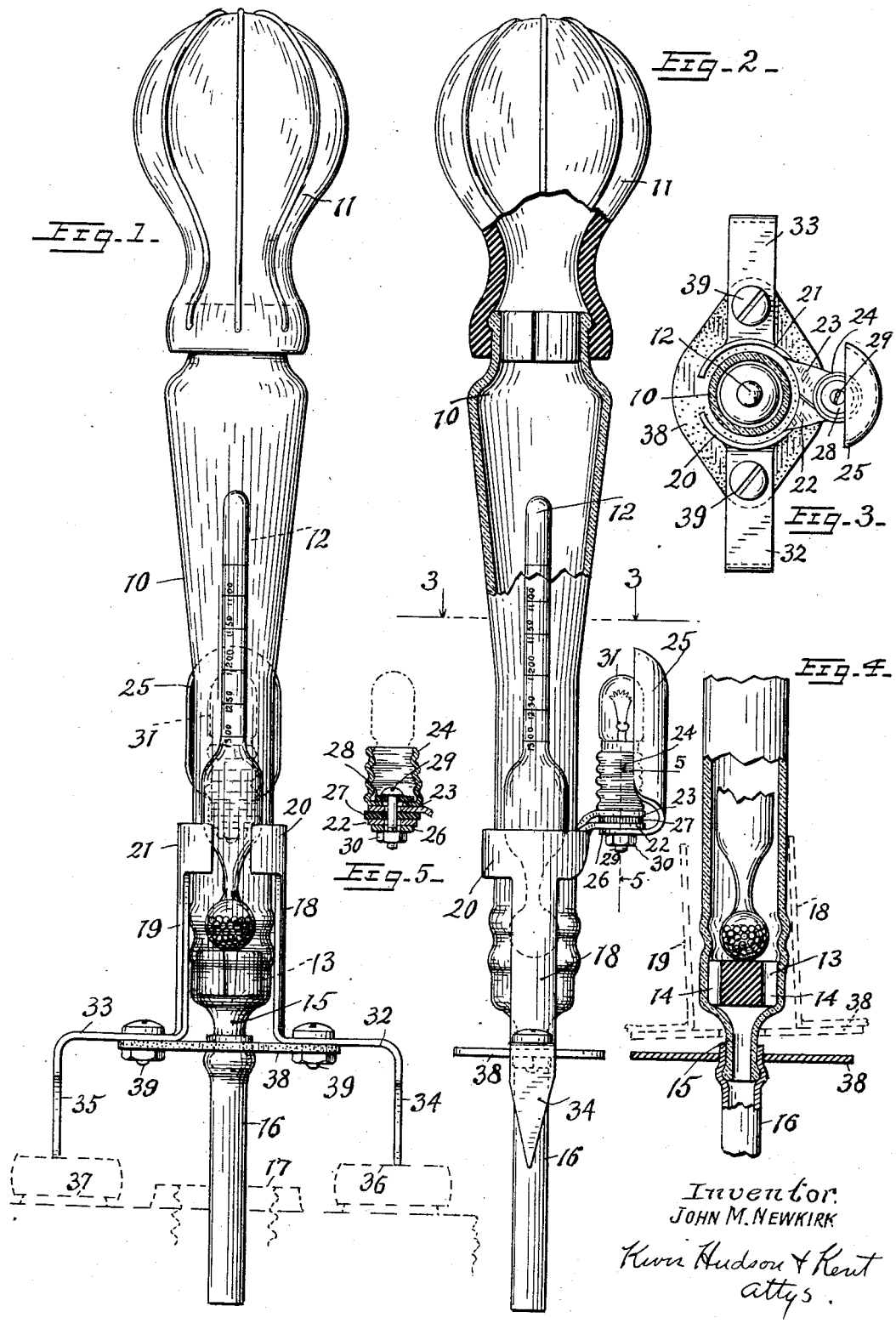
Inventor.
JOHN M. NEWKIRK
Kerr Hudson & Kent
attys.

Feb. 7, 1933. J. M. NEWKIRK 1,896,553
HYDROMETER SYRINGE WITH LAMP ATTACHMENT
Filed Nov. 9, 1931 2 Sheets-Sheet 2
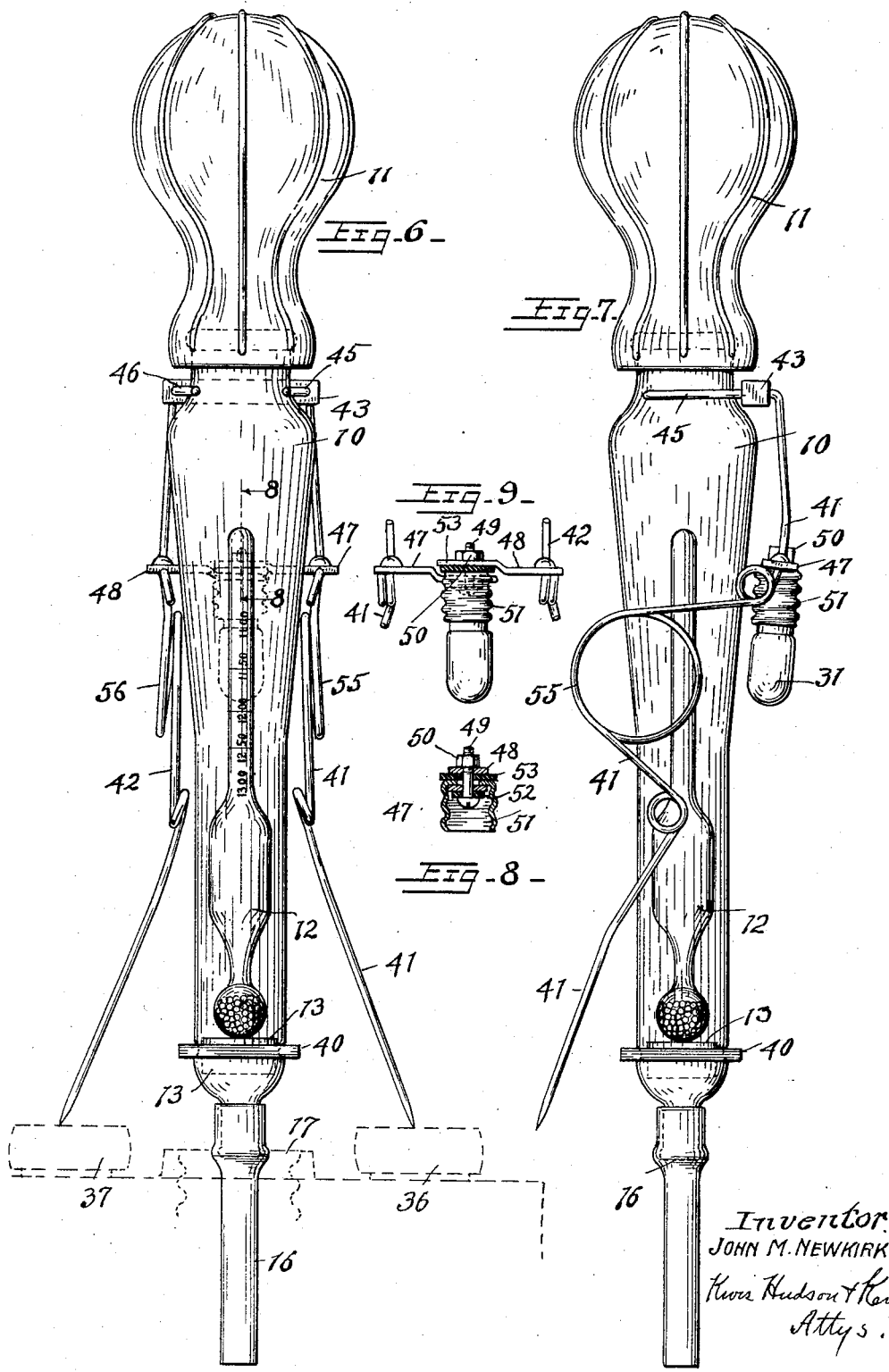
Inventor
JOHN M. NEWKIRK.
Knox Hudson & Kent
Attys.

Patented Feb. 7, 1933

1,896,553

UNITED STATES PATENT OFFICE

JOHN M. NEWKIRK, OF MOUNT HEALTHY, OHIO, ASSIGNOR TO WILLARD STORAGE BATTERY COMPANY, OF CLEVELAND, OHIO, A CORPORATION OF WEST VIRGINIA

HYDROMETER SYRINGE WITH LAMP ATTACHMENT

Application filed November 9, 1931. Serial No. 573,746.

This invention relates to a hydrometer syringe with lamp attachment, that is an electric lamp attachment by means of which the hydrometer float may be illuminated through electric current taken from a battery cell when the hydrometer is in position to withdraw liquid from that cell.

The storage battery of an automobile, being positioned generally beneath the floor-boards, is in a relatively dark place, and when a battery is tested while an automobile is in a garage or other building, as is often the case, it is practically impossible to read the float scale without withdrawing the hydrometer syringe and holding it up to the light. When this is done, battery acid drips from the hydrometer and frequently causes damage. The only alternative is to bring some artificial illuminant, as an electric lamp on an extension cord, into position to illuminate the hydrometer while it remains in operative position in the battery.

My invention overcomes this difficulty by providing illumination at the desired point without resorting to electric cords or the like, so that the float scale may be read without withdrawing the syringe from the battery.

One object of the invention therefore is the provision of means for illuminating the hydrometer float scale while the hydrometer is in operative position with respect to a battery.

Another object is the provision of means which will be adapted to automatically energize and deenergize such illuminating means, as the hydrometer is brought into and withdrawn from operative position.

Another object is the provision of means for utilizing current from the battery itself to energize the aforesaid illuminating means.

Still another object is the provision of a mounting for the electric lamp constituting the illuminating means which will permit the operator to turn the hydrometer on its axis in order to expose to view the scale of the float, without disturbing the electrical connections for the lamp.

A further object is the provision of means adapting the electrical connections to adjust themselves to battery terminals of uneven heights.

Other objects and features of novelty will appear as I proceed with the description of those embodiments of the invention which, for the purposes of the present application, I have illustrated in the accompanying drawings, in which Figure 1 is an elevational view of a hydrometer syringe embodying the invention, portions of a battery cell with which it cooperates being indicated in dotted lines.

Fig. 2 is an elevational view at right angles to Fig. 1, some of the parts being shown in longitudinal section.

Fig. 3 is a cross sectional view taken substantially on the line 3—3 of Fig. 2, with the lamp removed.

Fig. 4 is a fragmental vertical sectional view of the lower end of the syringe, indicating in dotted lines the position of the bracket when engaged with battery terminals of different heights.

Fig. 5 is a vertical sectional detail view taken substantially on the line 5—5 of Fig. 2.

Fig. 6 is an elevational view of a modified form of the invention.

Fig. 7 is an elevational view of the same structure taken at right angles to Fig. 6.

Fig. 8 is a sectional detailed view of the lamp socket mounting, the view being taken substantially on the line 8—8 of Fig. 6, and Fig. 9 is an elevational view of the lamp mounting and its supporting bridge.

Referring first to Figs. 1 to 4 inclusive of the drawings the glass barrel of a hydometer syringe is shown at 10. On its upper end is mounted the conventional rubber bulb 11, and within the barrel is a hydrometer float 12, the lower weighted end of which rests normally upon a rubber cushion 13 having peripheral notches 14 therethrough in order to provide free passage for liquid into and out of the barrel. Below the position for the cushion 13 the barrel has a constricted portion 15, on the lower extremity of which there is an encircling bead which serves to retain a flexible rubber tube 16 that is adapted to be projected into the battery electrolyte through an opening 17 in the cell cover that is normally closed by a vent cap, not shown. The above is all known construction, and forms no part of the present invention, except in combination with the construction now to be described.

The bracket for the lamp comprises two opposed metal strips 18 and 19 which run longitudinally of the barrel 10, and at their upper ends merge into transverse portions 20 and 21 which are curved to embrace the barrel and retain the bracket in position, although they are spaced from the exterior wall of the barrel sufficiently to provide considerable clearance. The transverse portions 20 and 21 at the rear of the bracket carry horizontal tabs 22 and 23 respectively which are spaced apart so as to be separated electrically, but which are joined mechanically so as to form a bridge between the side elements of the bracket. Just above the tab 23 and in electrical contact therewith is a lamp socket 24 having a horizontal inturned flange at its lower end. A reflector 25 may be employed and may be provided with an integral supporting plate 26 having an opening therethrough. Between the tabs 22 and 23 I mount an insulating washer 27, and above the inturned flange of the socket 24 I mount another insulating washer 28. These various parts are held together, as clearly shown in Fig. 5, by means of a small bolt 29 and nut 30. The central terminal of an electric lamp 31 is therefore adapted to make contact through bolt 29 and nut 30 with tab 22, while the brass shell of the lamp is adapted to make contact through socket 24 with tab 23.

The side elements 18 and 19 of the bracket have outwardly extending arms 32 and 33 respectively, from which depend projections 34 and 35 adapted to contact with the upper surfaces of cell terminals indicated at 36 and 37 in Fig. 1. The arms 32 and 33 are mechanically joined by means of a disc 38 of some stiff insulating material, which may be attached to the arms by means of bolts 39, or otherwise. The disc 38 has a central opening therethrough just large enough to pass over that part of tube 16 which contacts with the constricted portion 14 of the hydrometer barrel. Hence this disc is supported by the shoulder which is formed in the tube by the bead 15 at the lower extremity of the barrel. The lamp bracket may therefore be assembled complete, and may be slipped onto the barrel 10 from the lower end thereof by simply removing the tube 16. Then, when the latter is replaced, the engagement of the disc 38 with the shoulder in the tube provides adequate support for the bracket.

In Fig. 4 I have indicated by dotted lines the position the bracket may take in the event that the hydrometer is used to test a cell in which the two terminals are of different heights instead of the same height, as is the case in Fig. 1.

In the modified construction illustrated in Figs. 6, 7 and 8 the hydrometer itself is substantially like that previously described, except that a rubber guard 40 is fitted to the barrel of the syringe near the lower end thereof, an annular depression being provided in the glass for this purpose. In this form of the invention the bracket consists primarily of two flexible wires 41 and 42 which extend along the sides of the syringe barrel and at their upper ends project through a tie bar 43 of insulating material and terminate in resilient curved arms 45 and 46 which may be sprung over the neck of the syringe to embrace the latter, and thereby hold the bracket upon the barrel while permitting free relative rotation between the barrel and bracket.

Somewhat below the bar 43 there is a bridge between the two wires 41 and 42 which joins them mechanically but not electrically. This bridge comprises two metal strips 47 and 48 fastened together by a small bolt 49 and its nut 50. Strip 47 protrudes through a slot in the side of an inverted lamp socket 51 just below the inturned flange thereof. This strip therefore has electrical connection with the socket. It is insulated from the bolt 49 by an insulating washer 52. Between the socket 51 and the metal strip 48 there is a second insulating washer 53. The bolt 49 is therefore electrically connected to strip 48 and insulated from socket 51.

It will be noted that the wires 41 and 42 below the bridge above described are provided with loops 55 and 56 which add materially to the resiliency of these elements. Hence, when the lower diverging portions of the elements 41 and 42 contact with the terminals of a battery cell, they may yield independently of each other and thereby adjust themselves to terminals of different heights.

It is to be noted also that in the case of either form of the invention heretofore described, when the hydrometer is in operative position with the bracket elements in engagement with the terminals of a battery cell, it is possible for the operator who holds the device by the bulb 11 to impart rotation to the hydrometer barrel in order to bring the scale of the float 12 toward him, or into position to be read.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. A hydrometer syringe having a float and an electric lamp mounted thereon in position to illuminate the float, and having a pair of contactors which are connected to the terminals of the lamp and which are adapted to engage the terminals of a battery cell when the syringe is inserted therein to make a reading.

2. A hydrometer syringe having a float and an electric lamp mounted thereon in position to illuminate the float, and having a pair of contactors which are connected to the terminals of the lamp and which are adapted to engage the terminals of a battery cell when the syringe is inserted therein to make a reading, the contactors being yieldable and thereby free to engage the ends of terminals of uneven heights.

3. A hydrometer syringe having a float and an electric lamp mounted thereon in position to illuminate the float, and having a pair of contactors which are connected to the terminals of the lamp and which are adapted to engage the terminals of a battery cell when the syringe is inserted therein to make a reading, the mounting of the contactors upon the syringe possessing sufficient play to enable the contactors to engage the ends of terminals of uneven heights.

4. A lamp attachment for hydrometer syringes of the type having a transparent barrel and a float therein, comprising a bracket adapted to embrace the syringe barrel for the support of the lamp in a position alongside the barrel, whereby the hydrometer float may be illuminated, said bracket including two electrically separated metallic elements having downwardly projecting portions spaced apart a distance substantially equal to the distance between the two terminals of a battery cell, and a lamp socket electrically connected to the two said metallic elements.

5. A lamp attachment for hydrometer syringes of the type having a transparent barrel and a float therein, comprising a bracket adapted to embrace the syringe barrel for the support of the lamp socket in a position alongside the barrel, whereby the hydrometer float may be illuminated, said attachment and said barrel being relatively rotatable, and means including portions of said bracket for electrically connecting said socket with terminals of the battery while the hydrometer is in operative position with respect to the battery.

6. A lamp attachment for hydrometer syringes of the type having a transparent barrel and a float therein, comprising a bracket adapted to embrace the syringe barrel for the support of the lamp in a position alongside the barrel, whereby the hydrometer float may be illuminated, said bracket including two electrically separated metallic elements having downwardly projecting portions spaced apart a distance substantially equal to the distance between centers of the two terminals of a battery cell, and a lamp socket electrically connected to the two said metallic elements, said attachment being movable around the syringe barrel while supported thereupon.

7. In combination with a hydrometer syringe having a glass barrel with a lower constricted end and an encircling bead for the reception and retention of a piece of rubber tubing, a yoke mounted upon said constricted end having an opening therethrough large enough to pass said bead but too small to pass a rubber tube surrounding said bead, a pair of metallic elements extending alongside said barrel attached to said yoke, but electrically separated from each other, said metallic elements being provided with downwardly extending projections spaced apart a distance substantially equal to the distance between the centers of the two terminals of a storage battery cell, means at the upper ends of said elements for joining them mechanically while separating them electrically, and a lamp socket supported upon and electrically connected with the upper ends of said elements, and adapted to hold a lamp in position to illuminate the hydrometer.

8. In combination with a hydrometer syringe having a barrel with a hydrometer float therein, a yoke having an opening therethrough loosely surrounding said barrel, means on the barrel for supporting said yoke, metallic elements electrically separated, a lamp socket supported upon and electrically connected to said elements alongside said barrel, whereby the said float may be illuminated, said elements comprising downwardly projecting portions spaced to contact with the terminals of a storage battery cell, the mounting of said yoke and elements upon said barrel being loose enough to permit the lamp assembly to tilt when said projections encounter terminal of different heights.

9. A lamp attachment for hydrometer syringes of the type having a barrel, comprising a bracket formed principally of flexible wire, said bracket being arranged to embrace and be supported by the barrel of a hydrometer syringe, and a lamp socket supported upon said bracket and electrically connected to the side elements of the bracket alongside said barrel, whereby the hydrometer may be illuminated, said elements being otherwise electrically separated, the lower extremities of the bracket being spaced apart so as to be adapted to engage the terminals of a storage battery cell, the flexible wire in the two elements of the bracket being adapted to yield in different degrees so as to accommodate themselves to terminals of different heights.

In testimony whereof, I hereunto affix my signature.

JOHN M. NEWKIRK.